May 12, 1953 — R. FISHWICK — 2,638,020
EXPANDING REAMER
Filed April 11, 1949
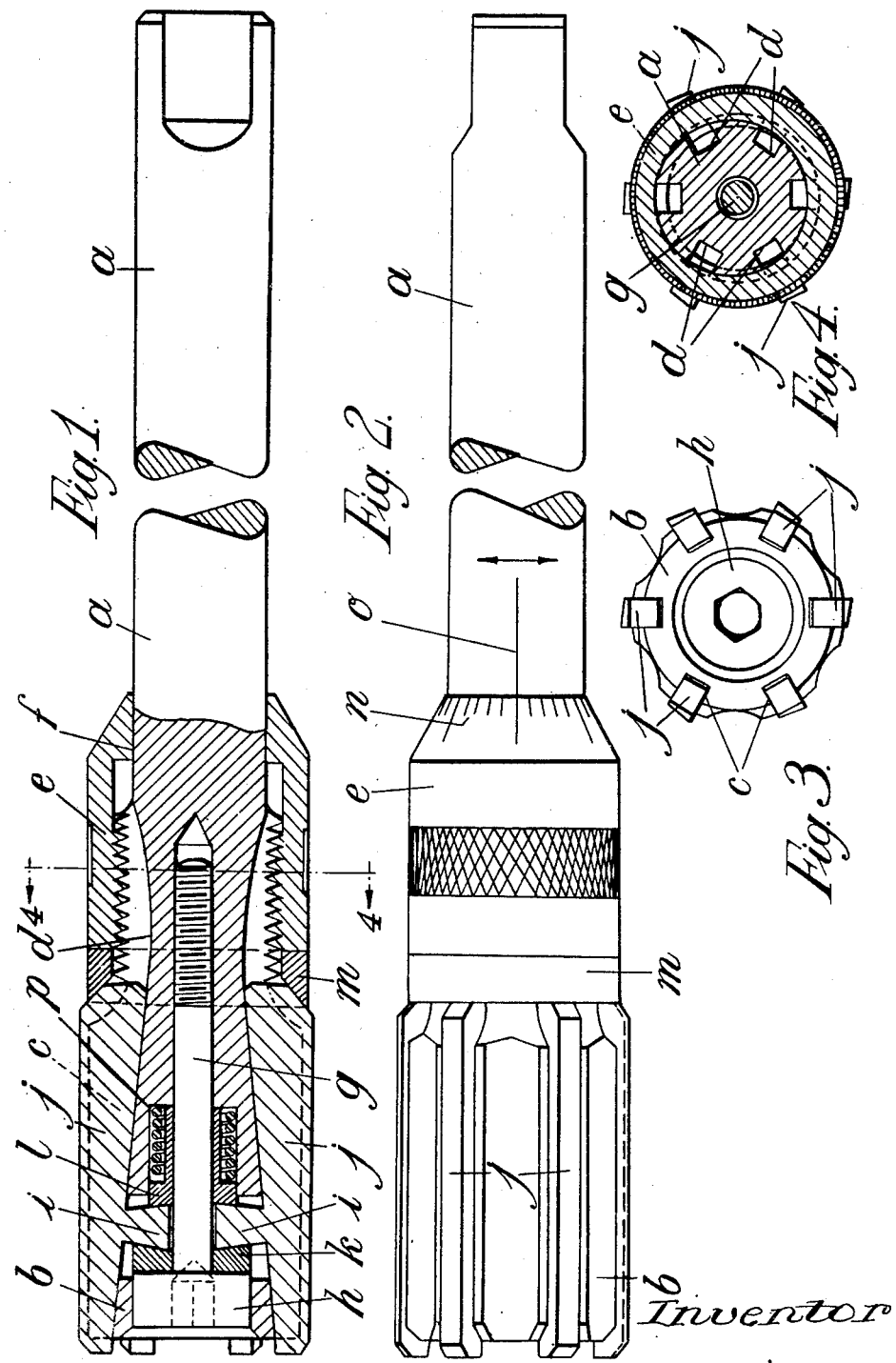
Inventor
R. Fishwick
By Glaser & Downing Suttle Attys Patented May 12, 1953

2,638,020

UNITED STATES PATENT OFFICE 2,638,020

EXPANDING REAMER

Robert Fishwick, London, England, assignor to Victory Engineers Limited, London, England Application April 11, 1949, Serial No. 86,676
In Great Britain April 12, 1948

2 Claims. (Cl. 77—76)

1

This invention relates to expanding reamers suitable for reamering blind holes or through or open holes which reamers comprise a plurality of separate cutting blades and more particularly, though not exclusively, to machine expanding reamers of this kind operable for example in a lathe, capstan, or drilling machine.

The object of the present invention is to provide forms of such reamers in which simplified arrangements are incorporated for adjusting the cutting blades.

It is a particular object of the present invention to provide an arrangement for adjusting the cutting blades which includes a sleeve member axially movable externally of the body to limit the adjusting position of the blades in combination with means for independently moving the blades in opposite directions, including resilient means urging the blades away from the sleeve member so that the latter can be moved to another position of adjustment without any frictional engagement at the ends of the blades adjacent thereto.

It is a more specific object of the present invention to provide an expandable reamer including a plurality of cutting blades disposed in slots in the reamer body and having projections extending from the blades inwardly toward the axis of the body and disposed in a chamber formed within the body and in which the blade adjusting means includes a headed rod in threaded engagement in a bore within the body and adapted to bear against the projections on the blades to move the same in one direction and resiliently actuated means housed in another chamber within the reamer body and normally bearing against the projections to move the blade in the opposite direction.

It is an additional object to provide in combination with the aforementioned arrangement an internally threaded sleeve mounted externally of the body and constituting a stop member to limit the inward movement of the blades effected by inward movement of the headed rod, The invention therefore consists in expanding reamers suitable for reamering blind holes or through or open holes which reamers comprise a plurality of separate cutting blades and have means for adjusting the setting of all the blades simultaneously.

Specifically the invention consists in an expandable reamer including a body portion having slots therein for accommodating cutting blades, which body portion is provided with an axial bore that extends inwardly from the end

2 carrying the blades and which bore is enlarged intermediate its ends and further enlarged adjacent its outer end to define successive chambers within the body, the bore including the chambers accommodating means for imparting adjusting movement to the blades and the blades having projections thereon extending through apertures in the body and communicating with the largest chamber.

More specifically in the present invention the slots accommodating the blades are inclined inwardly toward the longitudinal axis of the body and the blades have tapering bases lying in the slots.

From a specific standpoint, the present invention provides an expandable reamer including a headed rod in threaded engagement within the bore in the body with the headed end adapted to exert force on the projections of the blade to move the same in one direction combined with a flanged bushing or collar member surrounding the shank of the rod and disposed within the intermediate chamber or enlarged portion of the bore in the body and resilient means biased against the collar member to urge the same against the opposite sides of the projections to move the blades in an opposite setting position when the headed rod is adjustably withdrawn from the bore.

Further and more specific features will be apparent in connection with the following detailed description.

Referring to the accompanying drawings, which illustrate one form of reamer in accordance with the present invention:

Figure 1 is a view mostly in elevation but partly in section;

Figure 2 is a plan view of Figure 1;

Figure 3 is an end elevation of Figure 2 looking on the left end thereof and

Figure 4 is a section on the line 4—4 of Figure 1 looking in the direction of the arrows.

In carrying the invention into effect in accordance with the form of reamer illustrated, I provide a reamer body of solid steel $a$ furnished at one end with an enlarged portion $b$ having, say, six peripheral longitudinally extending, radially spaced slots $c$, the base of each slot being flat and inclined to the longitudinal axis of the body to about 5½°. The slots extend somewhat beyond the enlarged portion to an adjacent portion $d$ which is externally screw-threaded for the reception of an internally screw-threaded sleeve member $e$. This sleeve member at one end is bored appropriately so as to take a bearing on a plain cylindrical portion $f$ of the reamer body $a$.

The enlarged end of the body $a$ is furnished with a bored hole screw-threaded at its remote end and enlarged towards its outer end and into this hole is fitted a screw $g$ the head $h$ of which is adapted to act as an abutment for a series of lugs or projections $i$ inwardly projecting from cutter blades $j$ accommodated in the slots $c$; preferably a washer $k$ with a slightly conical face is interposed between the lugs and the screw head. The other side of each lug on the cutter blades $j$ is engaged by a spring-urged stop washer or flanged bushing $l$ accommodated in the enlarged end of the aforesaid hole, whereby the lugs $i$ are constantly maintained in contact with the screw head or interposed washer.

Each of the cutter blades $j$ is of tapered form in elevation, for example at an angle of $5\frac{1}{2}°$, and at one end, the thicker end, is sloped at 45° to the longitudinal axis of the reamer body to form a surface for engaging a correspondingly sloped end surface of the aforesaid screwed sleeve $e$; preferably a washer $m$ having a face inclined at 45° to the longitudinal axis is interposed between the screwed sleeve $e$ and these ends of the cutter blades $j$.

The abutment faces on the lugs $i$ of the cutter blades $j$ are preferably tapered to an angle of, for example, 10°.

In operation with blades $j$ assembled in position, the screwed sleeve $e$, which may be furnished with graduations $n$ for registering with a fixed mark $o$ on the reamer body, is set to a predetermined position and the central screw $g$ is tightened whereby the lugs of the cutter blades $j$ are forced in an axial direction against the action of the spring $p$ until the remote ends of the blades $j$ are arrested by the screwed sleeve $e$ or interposed washer $m$.

In order, say to expand the reamer, the central screw $g$ is unscrewed to a certain extent, the graduated sleeve $e$ rotated to its new position and the screw $g$ retightened. During the operation of releasing the locking screw $g$ the blades $j$ are forced by the spring $p$ to move away from the abutment surface provided by the graduated sleeve $e$, thus enabling the latter readily to be brought into its new position without frictional engagement with blade ends $j$. The screwed sleeve $e$ thus does not serve as a locking means but only acts as a stop, the locking means being provided by the central screw $g$.

It is therefore clear that the present invention provides in an expandable reamer a unique blade adjusting arrangement in which the body of the reamer is axially bored adjacent the cutting end and which bore is provided with successive enlarged portions or chambers, the largest chamber being outermost. Apertures provide communication between the slots and this enlarged chamber and the projections $i$ of the blades extend within this largest enlarged chamber. In the other chamber the flanged bushing $l$ is accommodated and this bushing surrounds the rod $g$ which has its inner end in threaded engagement with the bore adjacent the externally threaded portion of the body. The spring $p$ constituting resilient means also accommodated within the chamber intermediate the ends of the bore and urges the flanged end of the bushing $l$ against one side of the projections. The headed end of the rod $g$ constituting a movable abutment member for exerting force on the opposite side of the projections to move the blades in one setting direction. Thus the projections cooperate with the flanged bushing $l$ which in effect constitutes a collar surrounding the rod $g$ and the headed end of the rod $g$ in opposite setting movements of the blades with the internally threaded sleeve $e$ constituting a stop member rather than a locking member.

I claim:

1. An expandable reamer including a body having an enlarged portion at one end thereof and an externally threaded portion inwardly of and adjacent the enlarged portion, said enlarged portion having a plurality of longitudinally extending, radially spaced slots therein, and the base of each slot being inclined to the longitudinal axis of the body, an internally threaded sleeve on said threaded portion, said body having a bore extending inwardly from the enlarged end and terminating in a threaded portion within the threaded portion of the body, said bore having successive enlarged portions adjacent the outer end thereof, with the largest portion outermost, the body having radially spaced apertures providing communication between the largest enlarged portion and the said slots, a plurality of blades having tapering bases disposed in said slots, each blade having a projection extending therefrom and disposed within said largest enlarged portion, a headed rod threaded on its inner end remote from the head and within the bore for cooperation with the threads thereon, a flanged bushing about said rod and disposed within said other enlarged portion of the bore and having a flanged bearing on the projections of all the blades, a spring concentric with the axis of and within said last mentioned portion and normally exerting force on said flanged bushing to move the same outwardly, and means on said head for exerting force on said projections in opposition to said spring, whereby when said sleeve is moved away from said enlarged end, rotation of said screw moves all said blades and said bushing against the action of said spring to one setting position and upon reverse rotatation of said screw said spring exerts force on said bushing to move all said blades automatically to another setting position.

2. An expandable reamer including a body having an enlarged portion at one end, and an externally threaded portion inwardly of and adjacent said enlarged portion, said body having a longitudinally extending bore extending inwardly from the enlarged end and terminating within the body adjacent the said threaded portion, and said bore being enlarged intermediate its ends and adjacent its outer end to provide longitudinally spaced chambers, said body having a plurality of radially spaced, longitudinally extending slots provided therein, said slots extending from the outer end of the enlarged portion to the threaded portion, a plurality of blades each having a base and a projection extending outwardly of the base disposed in said slots, the side walls of the outermost chamber having apertures therein communicating with the slots, and the said projections extending through said apertures and being disposed within said chamber, a collar member within said other chamber and bearing on the projections of all the blades, resilient means disposed within said other chamber and contacting and normally exerting force on said collar member and thereby on all said projections and thereby said blades to move the same in one direction, a headed rod disposed within said bore and terminating in a threaded portion in engagement with the threaded portion of the bore and constituting a movable abutment member adapted to exert force on the projections and thereby the blades to move the same in a setting direction in opposition to said resilient means, and an internally threaded sleeve in threaded engagement with the threaded portion of said shank and axially movable relative thereto constituting a stop member to limit the inward movement of the blades effected by inward movement of the headed rod when the sleeve is moved in a direction toward the inner end of said shank in one setting direction, and upon reverse movement of said rod said resilient means moving said blades simultaneously away from said sleeve in another setting direction, said sleeve being thereupon moved toward said blades to fix the same in set position.

ROBERT FISHWICK.

References Cited in the file of this patent

UNITED STATES PATENTS

| Number | Name | Date |
| --- | --- | --- |
| 1,446,467 | Johnson | Feb. 27, 1923 |
| 1,544,656 | Kylin | July 7, 1925 |
| 1,611,186 | Habart | Dec. 21, 1926 |
| 2,145,370 | Pohlman | Jan. 31, 1939 |

FOREIGN PATENTS

| Number | Country | Date |
| --- | --- | --- |
| 16,662 | Great Britain | 1910 |
| 20,949 | Great Britain | 1911 |
| 566,442 | Great Britain | 1944 |